(12) United States Patent
Hashimoto

(10) Patent No.: US 6,293,120 B1
(45) Date of Patent: Sep. 25, 2001

(54) BUILDING AIR CONDITIONING SYSTEM USING GEOTHERMAL ENERGY

(75) Inventor: Toko Hashimoto, Nagato (JP)

(73) Assignee: Kabushiki Kaisha Toko Kogyo, Nagoto (JP)

(*) Notice: Subject to any disclaimer, the term of this patent is extended or adjusted under 35 U.S.C. 154(b) by 0 days.

(21) Appl. No.: 09/688,097

(22) Filed: Oct. 16, 2000

(30) Foreign Application Priority Data

Oct. 18, 1999 (JP) .................................................. 11-294886

(51) Int. Cl.⁷ .................................................. F25D 23/12
(52) U.S. Cl. .................................................. 62/260; 165/45
(58) Field of Search .................................. 62/260; 165/45

(56) References Cited

U.S. PATENT DOCUMENTS

| | | | |
|---|---|---|---|
| 4,157,014 | * 6/1979 | Clark, Jr. | 60/655 |
| 4,448,238 | * 5/1984 | Singleton et al. | 165/45 |
| 4,577,679 | * 3/1986 | Hibshman | 165/45 |
| 4,993,483 | * 2/1991 | Harris | 165/45 |
| 5,642,964 | * 7/1997 | DeMasters | 405/154 |
| 5,941,238 | * 8/1999 | Tracy | 126/641 |
| 6,041,862 | * 3/2000 | Amerman | 166/290 |
| 6,167,715 | * 1/2001 | Herbert | 62/260 |
| 6,220,339 | * 4/2001 | Krecke | 165/48.2 |

FOREIGN PATENT DOCUMENTS

| | | |
|---|---|---|
| 57-454 | 1/1982 | (JP) . |
| 57-195030 | 12/1982 | (JP) . |
| 58-16854 | 7/1983 | (JP) . |
| 59-21429 | 2/1984 | (JP) . |
| 60-151028 | 10/1985 | (JP) . |
| 60-263055 | 12/1985 | (JP) . |
| 61-268956 | 11/1986 | (JP) . |
| 4-46647 | 4/1992 | (JP) . |
| 5-230806 | 9/1993 | (JP) . |
| 6-226280 | 8/1994 | (JP) . |
| 7-62628 | 3/1995 | (JP) . |
| 7-44538 | 11/1995 | (JP) . |
| 8-74344 | 3/1996 | (JP) . |
| 8-15920 | 6/1996 | (JP) . |
| 8-218397 | 8/1996 | (JP) . |
| 8-312248 | 11/1996 | (JP) . |
| 9-31941 | 2/1997 | (JP) . |
| 9-59010 | 3/1997 | (JP) . |
| 9-101091 | 4/1997 | (JP) . |

* cited by examiner

Primary Examiner—William Doerrler
Assistant Examiner—Mark S. Shulman
(74) Attorney, Agent, or Firm—Armstrong, Westerman, Hattori, McLeland & Naughton, LLP

(57) ABSTRACT

A building air conditioning system using geothermal energy comprising an underground pipe being buried underground for transmitting geothermal energy from the underground to air from the outdoors and for controlling humidity of said air and cleaning said air, a cobble stone layer constituted by filling numerous cobble stones in a space under the floor of a building for introducing air from said underground pipe to heat-exchange this introduced air with geothermal energy stored therein and to control humidity of said air and to clean said air, and air supply means for supply air from said cobble stone layer to an inside of a room of the building.

8 Claims, 8 Drawing Sheets

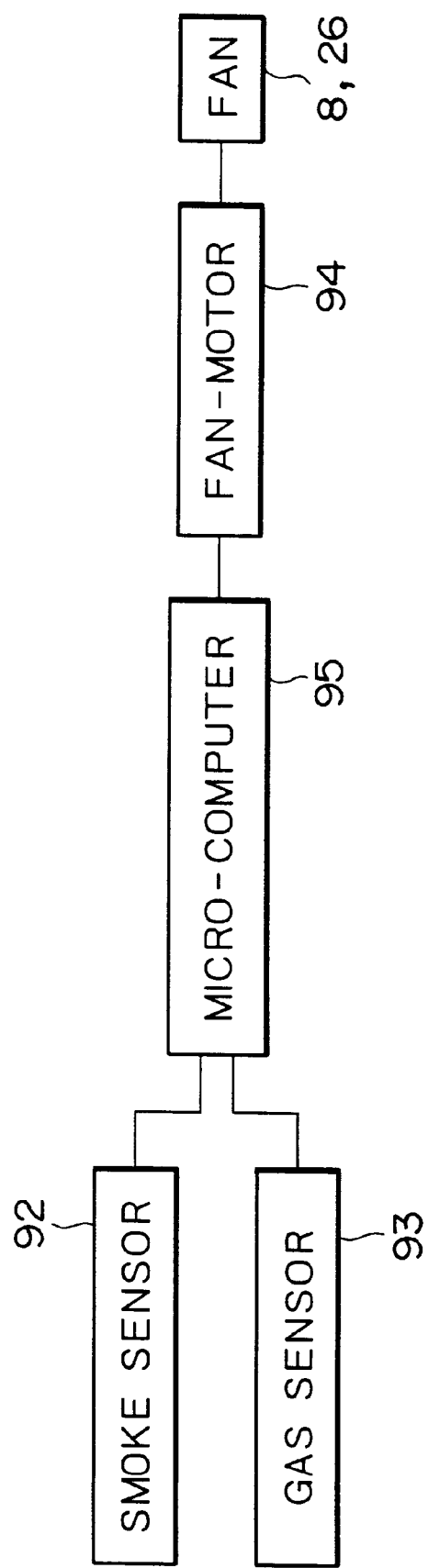

BUILDING AIR CONDITIONING SYSTEM USING GEOTHERMAL ENERGY

BACKGROUND OF THE INVENTION

1. Field of the Invention

This invention is related to a building air conditioning system using geothermal energy capable of applying to a building such as a detached dwelling house, a multiple dwelling house and a building.

2. Description of the Prior Art

Heretofore, an air-conditioning system using geothermal energy has been proposed. For example, it have been disclosed a cooling apparatus or the like coupling a fixture under a floor of a dwelling house and a fixture on the ground of the outdoors by a pipe formed in the ground and adapted to transmit geothermal energy to air from the outdoors in the ground during the process that air is passing through the pipe from the outdoor and to supply the heat-exchanged air into the dwelling house in Japanese Patent Application Publication No. 60149 of 1982.

In the cooling apparatus or the like described above, since air heat-exchanging with geothermal energy is merely performed during the process of moving air through the inside of the pipe, effect of heat conduction using geothermal energy is limited extremely and it has been extremely insufficient as utilization of geothermal energy to air conditioning. Moreover, in the cooling apparatus described above, merely air from the outdoors is heat-exchanged with geothermal energy, and humidity control and air cleaning for air from outdoors cannot be considered.

SUMMARY OF THE INVENTION

The object of the invention is to provide a building air conditioning system which is designed not only to perform air temperature control but also to perform air humidity control and air cleaning for the air from the outdoors by high-efficient heat-exchange with geothermal energy for air from the outdoors and to supply this air which has been temperature-controlled, humidity-controlled and cleaned into the building.

This invention includes an underground pipe formed to extend about 1 m to 10 m (that is to say, the length of the underground pipe is from about 1 m to about 10 m), and being buried underground in the direction of gravity, and for introducing air from the outdoors into the inside of this underground pipe and to heat-exchange said introduced air with geothermal energy from the underground (to transmit geothermal energy from the underground to said introduced air); a cobble stone layer constituted by filling numerous cobble stones in a space under the floor of a building, said cobble stone layer having a height within the range of from approximately 250 mm to approximately 1,000 mm (preferably, a height from approximately 300 mm to approximately 500 mm), said cobble stone layer storing geothermal energy in said numerous cobble stones and air layers existing in minute clearances between said numerous cobble stones, said cobble stone layer introducing said air to transmitted geothermal energy in said underground pipe into the inside thereof (said air is more cooled than the outdoors in the summer months, and more warmed than the outdoors in the winter months), said cobble stone layer heat-exchanging said introduced air with geothermal energy stored in said numerous cobble stones and said air layers, controlling humidity of said air by attaching water vapor contained in said air onto the surface of said numerous cobble stones when much-moisturized air moves in said cobble stone layer and by supplying moisture deposited on the surface of said numerous cobble stones to said air when dry air moves in said cobble stone layer, and cleaning said air by attaching minute impurities such as dust contained in said air onto moisture deposited on the surface of said numerous cobble stones when said air moves in said cobble stone layer; and air supply means for supplying air from said cobble stone layer under the floor into the inside of rooms of the building.

In this invention, said air heat-exchanged with geothermal energy in said underground pipes is designed to supply to the cobble stone layer formed in the space under the floor in order to supply and store geothermal energy to the whole of the cobble stone layer, whereby the whole of the floor of the building has come to be warmed by transmission of geothermal energy from said cobble stone layer under the floor in the winter months, and the whole of the floor of the building has come to be cooled by transmission of geothermal energy from said cobble stone layer under the floor in the summer months.

Moreover, in the invention, said underground pipe may be buried underground in the outside the building or may be buried underground in the inside the building.

Moreover, in the invention, a perforated pipe made by a wall in which a number of holes are formed is provided to said cobble stone layer under the floor, for example, in the approximately center portion of said cobble stone layer under the floor, said perforated pipe being for introducing air from said underground pipe to feed the introduced air to said cobble stone layer under the floor through said number of holes.

Moreover, in the invention, a hollow section is provided in a location (for example, four corners of said cobble stone layer under the floor) of a part of said cobble stone layer under the floor in order to form the passage for supplying said air from said cobble stone layer into the building, said hollow section having a substance for adding a preferable odor to air from said cobble stone layer under the floor and a substance for controlling humidity of said air and cleaning said air.

Moreover, in the invention, said underground pipe is constituted by an outer pipe and an inner pipe. Said outer pipe which upper surface and bottom surface are closed is designed to perform to heat-exchange air from the outdoors with geothermal energy while moving said air from the outdoors flowed from a hole formed on the upper portion of side wall of this outer pipe in the inside of this outer pipe downwardly. And said inner pipe which is shorter in diameter than said outer pipe and which is provided in the inside of said outer pipe and which bottom surface are opened is designed to perform to move said air from the bottom of the outer pipe upward in the inside of this inner pipe and to feed said air to said cobble stone layer.

Moreover, in the invention, said outer pipe is formed into a corrugated form in a cross section. Namely, in the invention, said outer pipe is formed by a side wall on which asperities are formed or which is formed corrugated.

Moreover, the building air conditioning system using geothermal energy according to the invention further is provided with an emergency stopping device for stopping a fan constituting said air supply means for introducing air from said cobble stone layer into the inside of the building when harmful gas (toxic gas) due to a fire, a smoke or gas leak is generated, and this emergency stopping device is provided with detecting means for detecting generation of the harmful gas due to a fire, a smoke or gas leak, and control means for stopping said fan based on a signal from this detecting means. Moreover, said fan may be performed to move said air from the outdoors into said underground pipe and also to move said air from the underground pipe into said cobble stone layer.

BRIEF DESCRIPTION OF THE DRAWINGS

FIG. 7 is a block diagram showing an emergency stopping device provided in the first embodiment.

DESCRIPTION OF A PREFERRED EMBODIMENT

Figure 1:
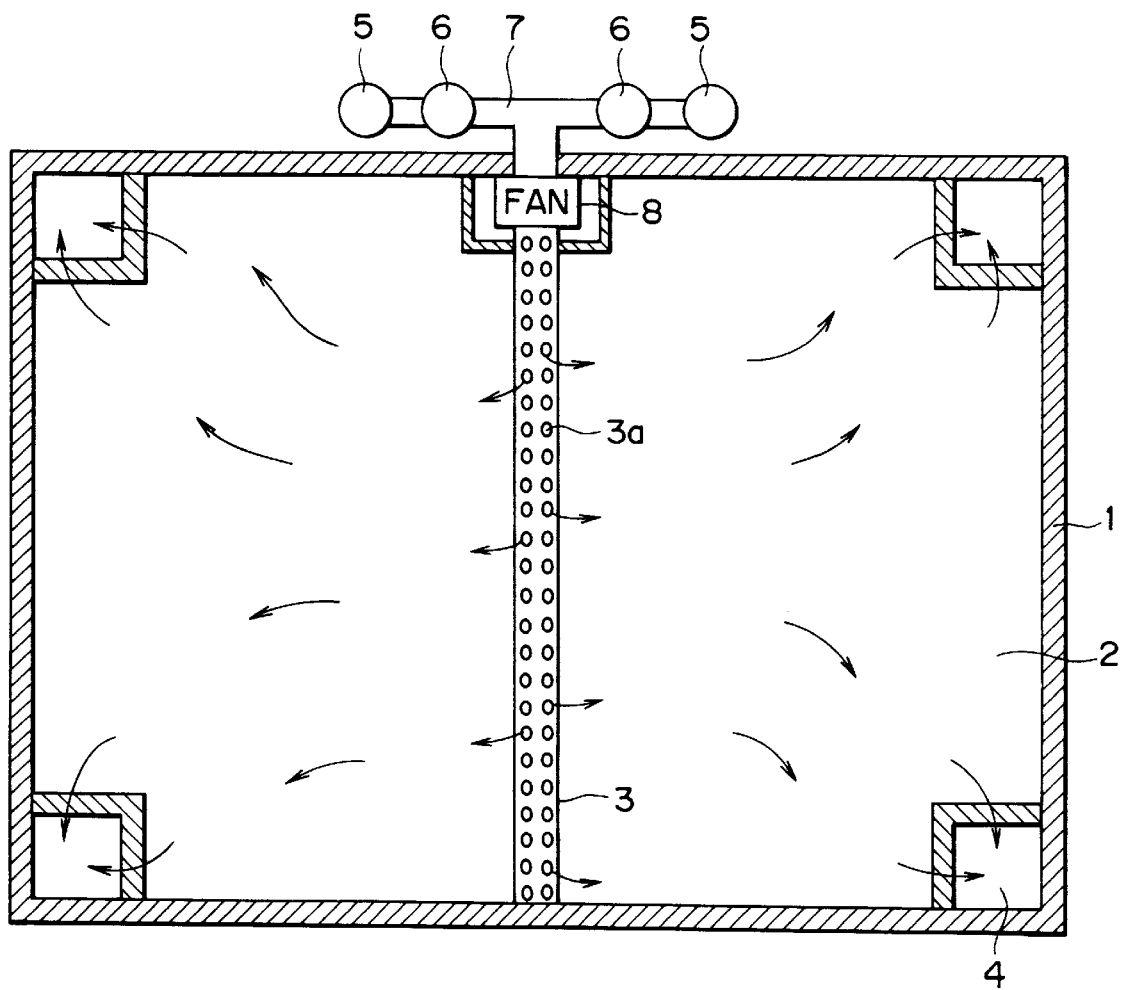
FIG. 1 is a horizontal sectional view of a first embodiment according to the invention.

FIG. 1 is a horizontal sectional view for illustrating a first embodiment according to the invention. Referring to FIG. 1, a reference numeral 1 is an inverted T-shaped foundation of the building made of concrete in a cross section, which foundation is formed on an outer periphery of a building, and a reference numeral 2 is a cobble stone layer installed under the floor of the building (the individual cobble stone is omitted in illustration in FIG. 1) provided by filling a number of cobble stones within a space under the floor surrounded by this foundation 1, a floor of the building and the ground. For example, height of the cobble stone layer under the floor 2 is about 400 mm.

Moreover, in FIG. 1, a reference numeral 3 is a perforated pipe which is inserted into the approximately central portion of the inside of the cobble stone layer under the floor 2 and on which numerous holes 3a are formed. Air from underground pipes 5 and 6 described below is introduced into this perforated pipe 3. Subsequently, the air introduced into the inside of this perforated pipe 3 is supplied into the inside of the cobble stone layer 2 under the floor.

Moreover, in FIG. 1, a reference numeral 4 is a hollow section respectively formed at four corners of said cobble stone layer 2 within said space under the floor, and reference numerals 5 and 6 are the underground pipes buried underground of a location of the outside of said foundation 1, that is, a location of the outside of the building.

In an example of FIG. 1, said two underground pipes 5 and 6 are connected in series, and a set of these two underground pipes 5 and 6 connected in series is connected with said perforated pipe 3 through a fan 8 described below. For example, length of said underground pipes 5 and 6 in FIG. 1 is approximately 5 m. Moreover, in FIG. 1, a reference numeral 7 is a piping for feeding air from said underground pipes 5 and 6 to said perforated pipe 3, and a reference numeral 8 is a fan for drawing air from outdoors into said underground pipes 5 and 6, as well as for feeding air from said underground pipes 5 and 6 into said cobble stone layer 2 through said perforated pipe 3.

Figure 2:
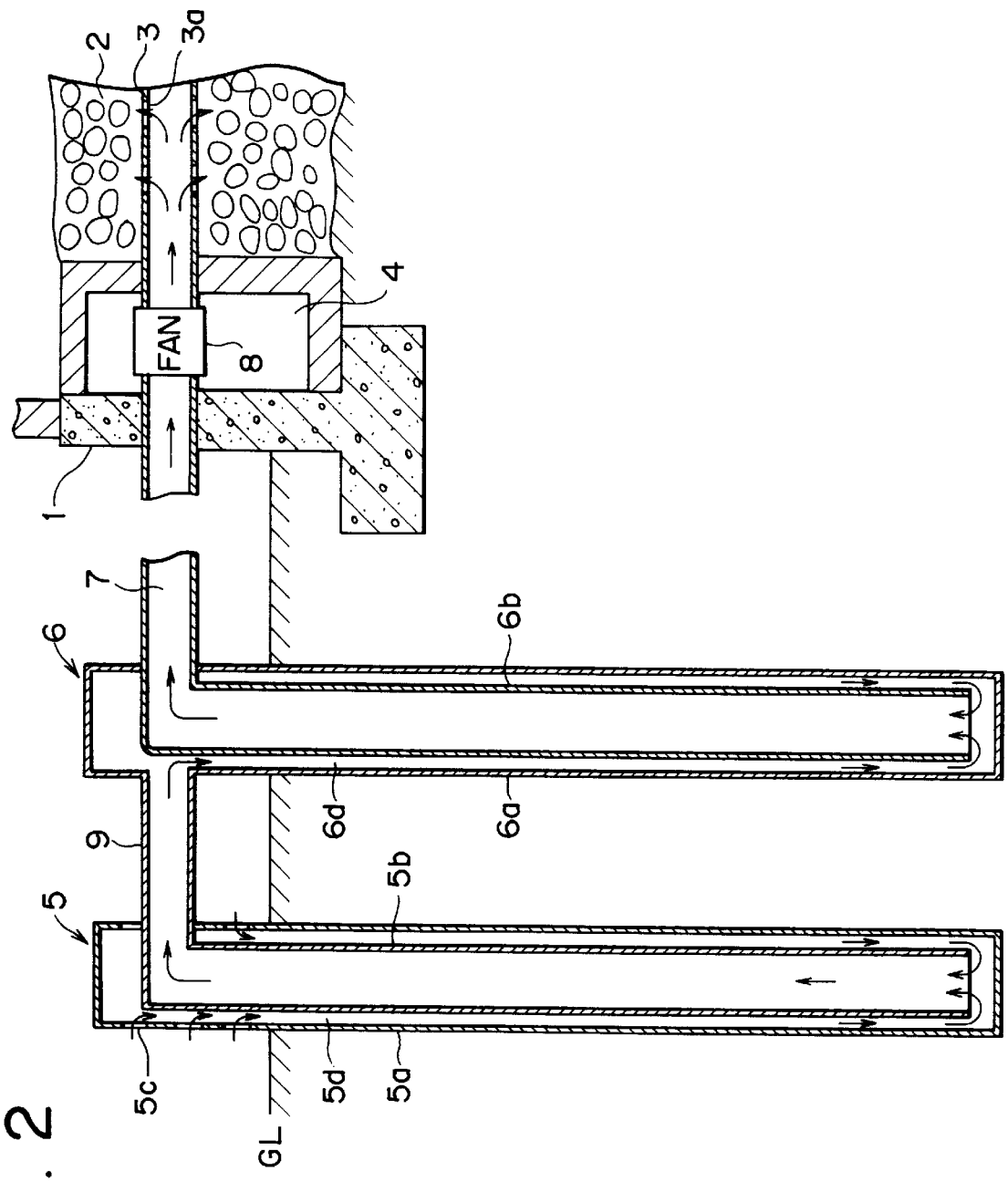
FIG. 2 is a longitudinal sectional view showing an underground pipe, a perforated pipe, and cobble stone layer of the first embodiment.
Figure 3A:
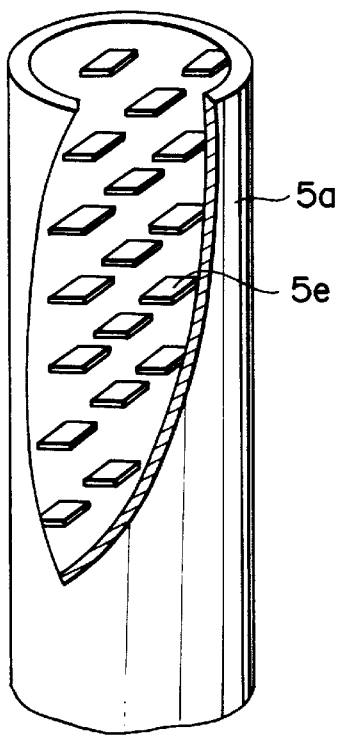
FIG. 3(a) is a perspective view showing a part of an outer pipe constituting the underground pipe of the first embodiment.
Figure 3B:
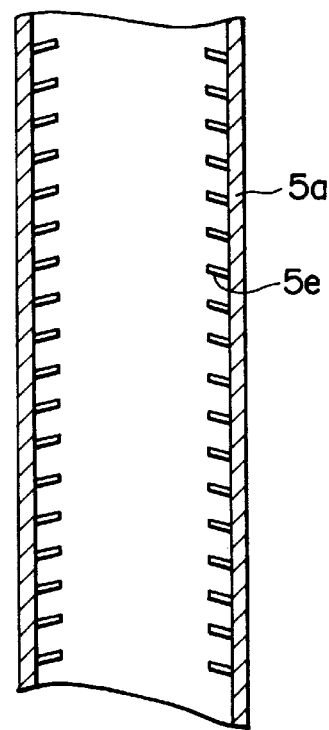
FIG. 3(b) is a longitudinal sectional view showing a part of said outer pipe.
Figure 3C:
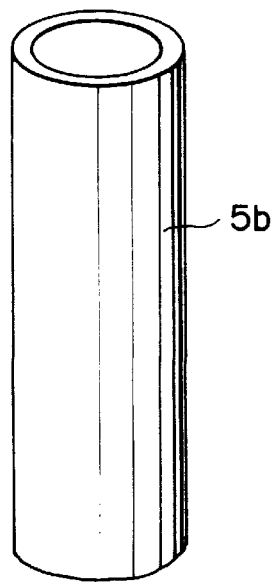
FIG. 3(c) is a perspective view showing a part of an inner pipe constituting the underground pipe of the first embodiment.
Figure 3D:
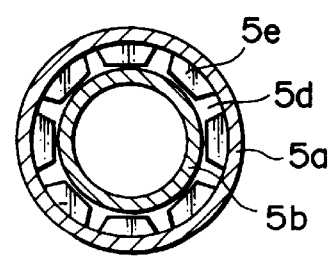
FIG. 3(d) is a horizontal sectional view showing a part of said outer pipe and a part of said inner pipe of the first embodiment.

Next, FIG. 2 is a longitudinal sectional view for illustrating said underground pipes 5 and 6, said cobble stone layer 2, and said perforated pipe 3. Referring to FIG. 2, the underground pipes 5 is constituted by an outer pipe 5a larger in diameter than an inner pipe 5b mentioned after, made of metal or made of plastic, of which the upper surface and the bottom surface are closed by a cover, and an inner pipe 5b shorter in diameter than the outer pipe 5a, made of metal or made of plastic. A plurality of holes 5c for introducing air from the outdoor are formed on an upper portion than a ground level GL of the outer pipe 5a. Moreover, said inner pipe 5b is provided within said outer pipe 5a, so that a predetermined clearance is formed between the inner wall surface of said outer pipe 5a and the outer wall surface of said inner pipe 5b. As described above, the underground pipes 5 of the first embodiment is "a double pipe structure" constituted by said outer pipe 5a and the inner pipe 5b.

A bottom surface of said inner pipe 5b is opened. Moreover, the upper portion of said inner pipe 5b is connected with the clearance between an outer pipe 6a and the inner pipe 6b constituting the underground pipe 6 by the piping 9 as shown in FIG. 2.

On the other hand, the outer pipe 6a constituting the underground pipe 6 is closed at the upper surface and the bottom surface by the cover as shown in FIG. 2. Moreover, a bottom surface of the inner pipe 6b is opened. Moreover, an upper surface of the inner pipe 6b is connected with the perforated pipe 3 by the piping 7.

Next, an internal structure of said underground pipes 5 and 6 in the first embodiment will be described with reference to FIG. 3 in more detail. A number of fins 5e formed by metal or plastic are formed on the inner wall surface of said outer pipe 5a (an illustration of fins 5e is omitted in FIG. 2). These fins 5e are protruded and arranged in a perpendicular direction or in a slanting direction to the direction where air moves through a clearance 5d (refer to FIG. 2 and FIG. 3(d)) between the outer pipe 5a and the inside pipe 5b.

These number of fins 5e have an action that said air contacts with the surfaces of said number of fins 5e to which geothermal energy is transmitted from the underground, and heat-exchanging of said air with geothermal energy is performed extremely efficiently during the process that air from the outdoor moves through said clearance 5d.

Next, an operation of said underground pipes 5 and 6 in the first embodiment will be described with reference to FIG. 1 to FIG. 3. Air from outdoors is introduced from holes 5c formed on the upper of said outer pipe 5a into said clearance 5d by operation of said fan 8 (by ventilation power of said fan 8) as shown by a plurality of arrows in FIG. 2. This air introduced into the clearance 5d moves though said clearance 5d downwardly by said ventilation power of said fan 8, and contacts with the surfaces (a surface-contact portions) of said number of fins 5e during this process. Geothermal energy is transmitted from the underground to the outside pipe 5a and said fins 5e at all time and is stored in the outside pipe 5a and said fins 5e. Therefore, said air is designed to contact with the inner wall surface of said outside pipe 5a and the surfaces of said number of fins 5e during said process in which said air moves through said clearance 5d downwardly, thereby to heat-exchange with geothermal energy efficiently.

Moreover, said fins 5e have not only the action which transmit geothermal energy to said air, but also the action as follows. Namely, when much-moisturized air in moving through the inside of said clearance 5d contacts with said fins 5e, humidity (moisture) from said air is transferred to the surface of said fins 5e, thereby said air to be dehumidified. Moreover, conversely, dry air in moving through said clearance 5d contacts with said fins 5e, so that moisture deposited on the surface of said fins 5e are supplied to said air, thereby said air to be humidified.

Namely, when said air from the outdoor is moved downwardly through the inside of said clearance 5d, moisture (water vapor) included in the air is deposited on said number of fins 5e in the case that said air is a moistened air, thereby said air to be dehumidified (humidity controlled). Moreover, when said air from outdoors is dry, moisture deposited on said number of fins 5e is supplied to said air, thereby said air to be humidified (humidity controlled). As described above, the surfaces (the surface-contact portion) of said fins 5e also serves as "a humidity control action" for air moving through the inside of said clearance 5d.

Moreover, minute impurities included in the air which moves through the inside of said clearance 5d is deposited onto moisture deposited on the surfaces of said fins 5e, when the air including minute impurities such as dust contacts with said fins 5e, thereby said air to be cleaned. Namely, when said air from the outdoor is moved downwardly through the inside of said clearance 5d, said air contacts with said number of fins 5e, so that minute impurities such as the minute dust included in said air are deposited onto moisture of the surfaces of said number of fins 5e, thereby said air to be cleaned. As described above, the surfaces (the surface-contact portions) of said fins 5e also serves as "a cleaning action" for said moving air.

Next, after said air is moved downwardly through the inside of said clearance 5d to reach up to the bottom of the outer pipe 5a, said air flows into the inside of the inner pipe 5b from the lower surface (being opened) of said inner pipe 5b to move upwardly therethrough as shown by a plurality of arrows in FIG. 2. Said air moves to the underground pipe 6 through said piping 9 thereafter. The air which has been moved into the underground pipe 6 is moved downwardly through the inside of the clearance 6d between an inner side wall of an outer pipe 6a and an outer side wall of the inner pipe 6b. The inner wall surface of the outer pipe 6a also is provided with a number of fins (the same as said fin 5e shown in FIG. 3(a)), which illustration is omitted in FIG. 2. Therefore, said air contacts with the inner wall surface of said outer pipe 6a and the surfaces (the surface-contact portions) of said fins 5e during said process of moving though said clearance 6d downwardly, whereby air heat-exchanging with geothermal energy, air humidity control, and air cleaning are performed.

Next, referring to FIG. 2, after said air is moved downwardly through said clearance 6d to reach up to the bottom of the outer pipe 6a, said air moves into the inside of the inner pipe 6b upwardly and is fed to said perforated pipe 3 through the piping 7 and the fan 8. This air sent to the perforated pipe 3 is fed from a number of holes 3a of said perforated pipe 3 into the cobble stone layer 2 by ventilation power of said fan 8 as shown by the arrow in FIG. 1.

In said cobble stone layer 2 under the floor, the numerous stones are filled. Geothermal energy from the underground has been stored in said numerous cobble stones and air layers in minute clearances between said numerous cobble stones at all time efficiently.

The air sent by said fan 8 to the cobble stone layer 2 under said floor moves toward said hollow section 4 by ventilation power of said fan 8 to reach said hollow section 4 as shown by a plurality of arrows in FIG. 1.

When much-moisturized air passes through said cobble stone layer 2 under the floor, moisture (water vapor) contained in the air is deposited on the surfaces of said numerous cobble stones to condensate to droplets of water, thereby said air to be dehumidified. Moreover, said cobble stone layer 2 under the floor supply moisture being deposited in the condition of droplets of water on the surfaces of said numerous cobble stones to air as water vapor when drying air passes therethrough, thereby said air to be humidified. As described above, said cobble stones also serve as "an air humidity control action" for controlling humidity of air moving therethrough.

Moreover, when said air including minute impurities such as dust passes through said cobble stone layer 2 under the floor, said air deposits the minute impurities such as dust contained in said air onto moisture of the surface of said numerous cobble stones, thereby to allow to clean said air. As described above, said cobble stones also serve as "an air cleaning action" for cleaning air moving therethrough.

Next, a detail structure of a hollow section 4 of a first embodiment will be described with reference to FIG. 4. Said hollow section 4 is constituted by a rising-up section of an inverted T-shaped foundation of the building made of concrete and a wall 11 which is built at the places of four corners of said cobble stone layer 2 and has a plurality of holes 11a to be opened as shown in FIG. 1. This hollow section 4 preferably has a plane of approximately one meter square.

Figure 4:
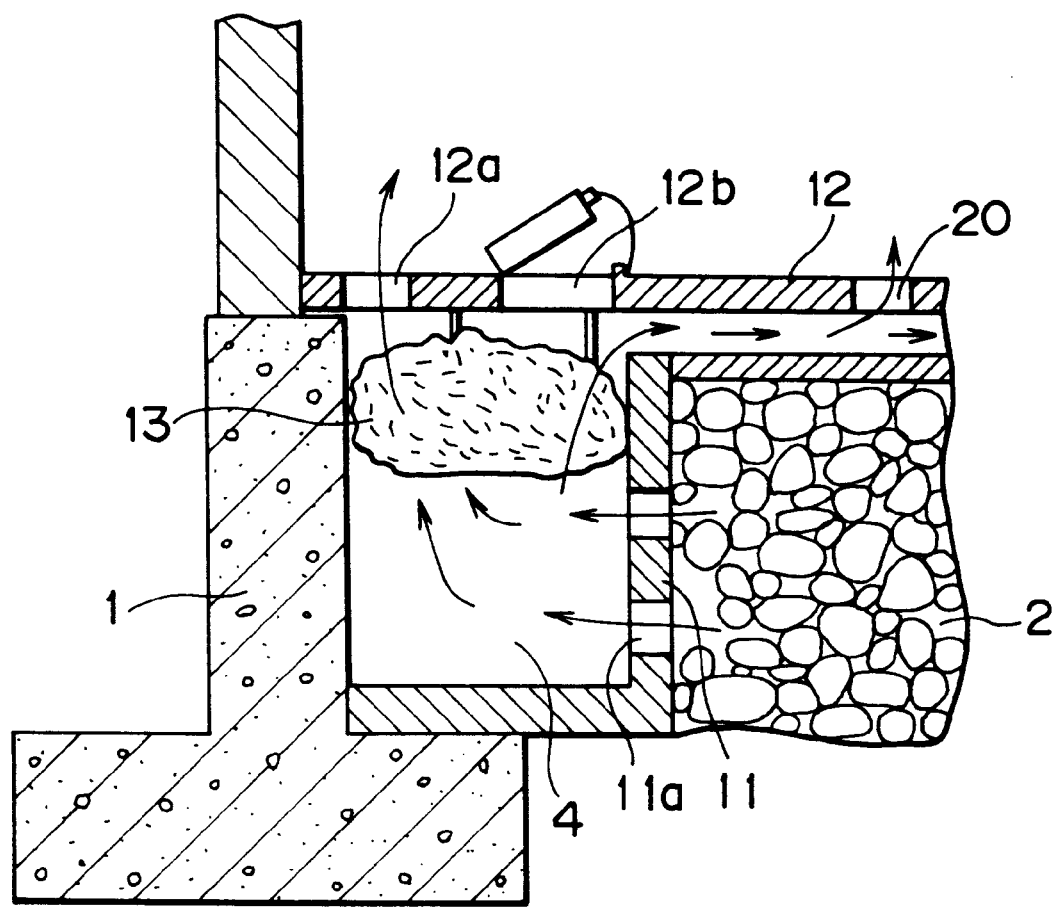
FIG. 4 is a view for illustrating cobble stone layer under the floor of a dwelling house and a hollow section of the first embodiment.

As shown in FIG. 4, air heat-exchanged with geothermal energy, controlled in humidity and cleaned in said cobble stone layer 2 floats from said cobble stone layer 2 into the hollow section 4 through the hole 11a of the wall 11 by said ventilation power of said fan 8, and furthermore, is fed into the building (rooms of the building, an air-flowing passage between the room and an outside wall of the building, and an air-flowing passage between the floor 12 of the building and said cobble stone layer 2 or the like) through a hole 12a and a hole 20 formed on the floor 12 of the building.

Moreover, a net-formed sack 13 in which an aromatic, charcoal, and powdered tourmaline or the like are packed in a space within said hollow section 4 is suspended by a cord or the like. Said aromatic has an action of adding a comfortably fragrant odor to ambient air. Said charcoal has actions controlling humidity in air, absorbing a smell (stench) component in air and masking the smell or the like.

Moreover, said "tourmaline" is an ore which also is designated as an electric stone, and since static electricity of a very small quantity is generated at all time, said "tourmaline" is the ore designated as there are actions cleaning ambient air and releasing minus ions to ambient air or the like. Said powdered tourmaline has the actions cleaning ambient air and releasing minus ions to ambient air or the like (it is said that minus ions have the actions adjusting an autonomic nervous of human or the like).

Therefore, in the first embodiment, "fair heat-exchanged with geothermal energy, temperature-controlled and cleaned by said cobble stone layer 2" is designed to pass through the inside of said sack 13 of said hollow section 4 (or to contact with said sack 13), thereby to be converted into "air in which the comfortably fragrant odor is included, humidity is controlled appropriately, the smell is removed, and to be cleaned" and to be supplied to the inside of the building.

Moreover, referring to FIG. 4, a reference numeral 12*b* is an inspection opening. An user can place his hand thereinto through this inspection opening 12*b* to perform replacement of the aromatic, charcoal, and powdered tourmaline in said sack 13 or the like.

Figure 5:
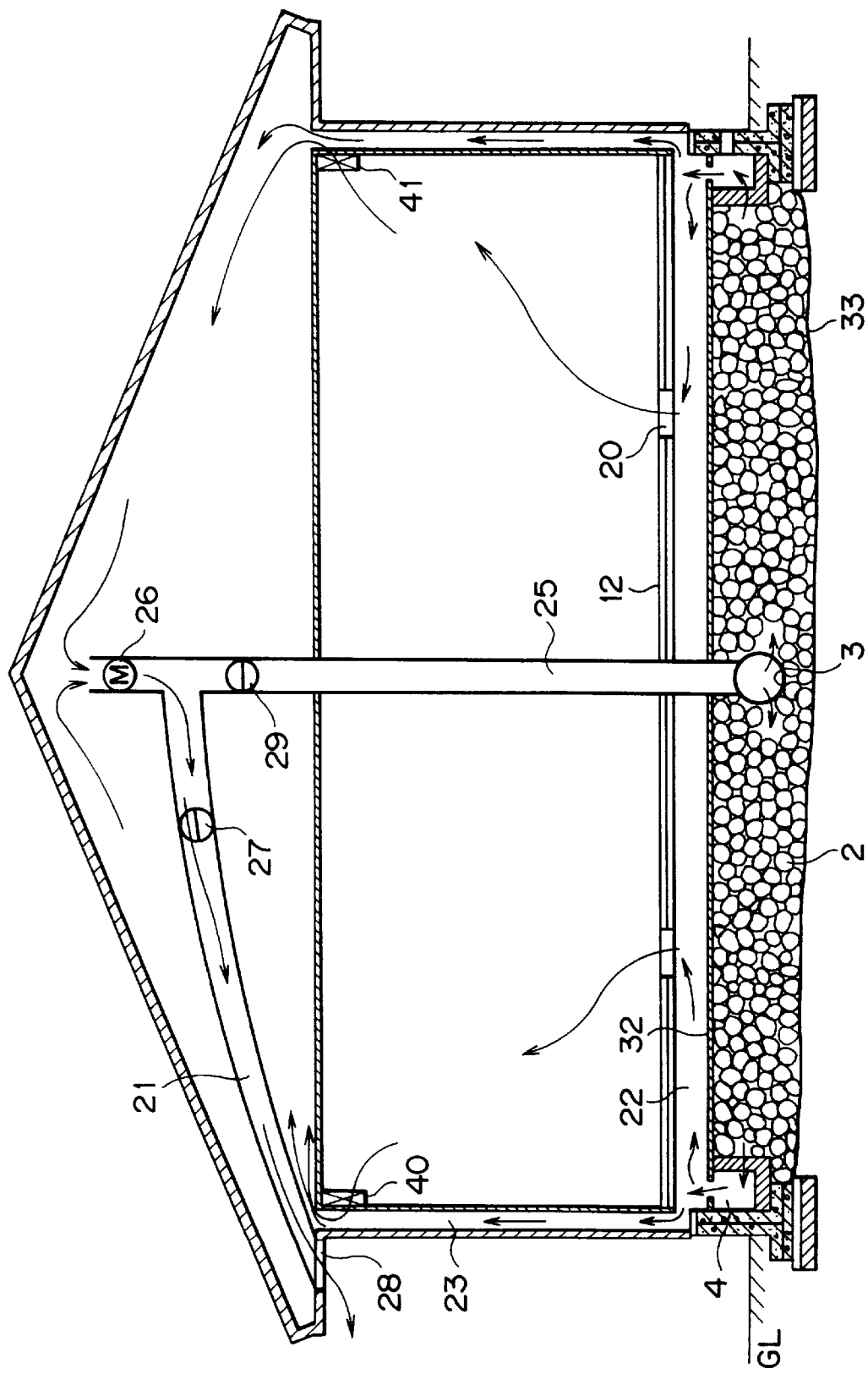
FIG. 5 is a view for illustrating an operation in the summer months where applying the first embodiment to a dwelling house.

Next, the operation in the summer months where applying the air-conditioning system of the first embodiment is applying to the dwelling house will be described with reference to FIG. 5. Referring to FIG. 5, a reference numeral 21 is an attic air-flowing passage for releasing air in an attic of the building to the outdoors, a reference numeral 22 is an air-flowing passage between the floor 12 of the building and the cobble stone layer 2, a reference numeral 23 is an outer wall air-flowing passage provided between an outer wall and the room of the building so as to flow air from the air-flowing passage under the floor 22 into the attic of the building and a reference numeral 20 is a ventilation opening for introducing air in the air-flowing passage under the floor 22 into the room.

Said cobble stone layer 2 under the floor is formed so as to have height of, for example, 400 mm (approximately 500 mm, or approximately 600 mm or the like also may be possible) across the upper and the lower of GL (the ground level) in order to tend to accumulate geothermal energy from the underground.

Moreover, a concrete layer of thickness of approximately 70 to 100 mm is formed, or a heat insulating material 32 such as foaming urethane of thickness of 25 to 30 mm is laid on the cobble stone layer 2 under the floor.

According to this constitution, geothermal energy stored in the cobble stone layer 2 is designed to not be lost to the outside easily.

Moreover, the lower surface of the cobble stone layer 2 under the floor is provided with a humidity resistance sheet 33 made of vinyl or the like. This humidity resistance sheet 33 can prevent for moisture to move upwardly from the underground into the cobble stone layer 2, on the other hand, it permits moving of moisture downwardly from the cobble stone layer 2 into the underground. That is to say, since said humidity resistance sheet 33 are such arranged that a plurality pieces of sheets are folded one another, moving upwardly of moisture from the lower is prevented, however, moisture from the upper is movable by gravity through a clearance of a portion that a plurality pieces of sheets are folded.

Moreover, referring to FIG. 5, a reference numeral 25 is an inner wall air-flowing passage for applying said air in the attic to said cobble stone layer 2 while passing through a space formed between two inner walls between the rooms.

Moreover, referring to the FIG. 5, a reference numeral 26 is a fan provided on the attic, and a reference numeral 27 is a valve provided on the midpoint portion of said attic air-flowing passage 21 and provided between said fan 26 and an exhaust port 28 communicated with the outdoors. Moreover, a reference numeral 29 is a valve provided on the midpoint portion of said inner wall air-flowing passage 25 and interposed and arranged between said fan 26 and the cobble stone layer 2.

Said valve 27 is designed to be opened in the summer months so that sultry air in the attic can be released through said attic air-flowing passage 21 as well as to be closed in the winter months so that warm air in the attic cannot be lost to the outdoors by a temperature sensor and a control device (a micro-computer) (not shown), for example. Moreover, said valve 29 is designed to be closed in the summer months so that warm air in the attic cannot warm the room through said inner wall air-flowing passage 25, as well as to be opened in the winter months so that warm air in the attic can be supplied to the cobble stone layer 2 while warming the room through said inner wall air-flowing passage 25 by a predetermined temperature sensor and the control device, for example.

Moreover, referring to FIG. 5, a reference numeral 40 and 41 are indoor ventilation openings for releasing air in the room to the attic.

In the dwelling house of FIG. 5, when temperature of air in the attic (a ceiling) is raised by solar heat and becomes 25° C. or more in the summer months, a ventilation motor (a motor for the fan 26) is started to revolve automatically by activities of a thermostat, the temperature sensor and the control device (not shown), a valve 27 becomes a condition of "opened" so as to release the warmed air in the ceiling to the outdoors (on the other hand, and the valve 29 becomes a condition of "closed").

On the other hand, since said fan 8 is designed to revolve at all time, in the summer months (at the time of temperature of 25° C. or more), air from the outdoors (high temperature and much-moisturized air) is cooled at all time by geothermal energy (cool air) in the process of the air of passing through the underground pipes 5 and 6 in said FIG. 2, as well as it is dehumidified and cleaned by said fins 5*e* (the surface-contact portions) in that process.

And then, this air flows from the underground pipes 5 and 6 into said cobble stone layer 2 cooled more than air in the outdoors by geothermal energy through said perforated pipe 3 in addition. At this time, moisture (water vapor) in said air condenses into dew on the surface of the numerous cobble stones, thereby said air to be dehumidified. This is an air humidity control action of the cobble stone layer 2 under the floor. Moreover, at this time, minute impurities such as the dust included in said air deposit onto moisture of the surface of said numerous cobble stones, thereby said air to be cleaned. This is an air cleaning action of the cobble stone layer 2.

And, the air heat-exchanged with geothermal energy, dehumidified and cleaned in this cobble stone layer 2 is moved into said hollow section 4 (referring to FIG. 1 and FIG. 2 reference). Air moved into said hollow section 4 passes through said sack 13 or contacts with this sack, thereby to be supplied to the inside of the building after odor is added, humidity is controlled, and the smell is masked. Said air supplied into the inside of the building passes through the inside of the room and passes through said outer wall air-flowing passage 23, thereby to cool the building and then to move up to the attic and to be released to the outdoors by the fan 26 and the valve 27 as shown by the arrow in FIG. 5.

Next, an operation in the winter months where applying the first embodiment to the dwelling house will be described with reference to FIG. 6.

Figure 6:
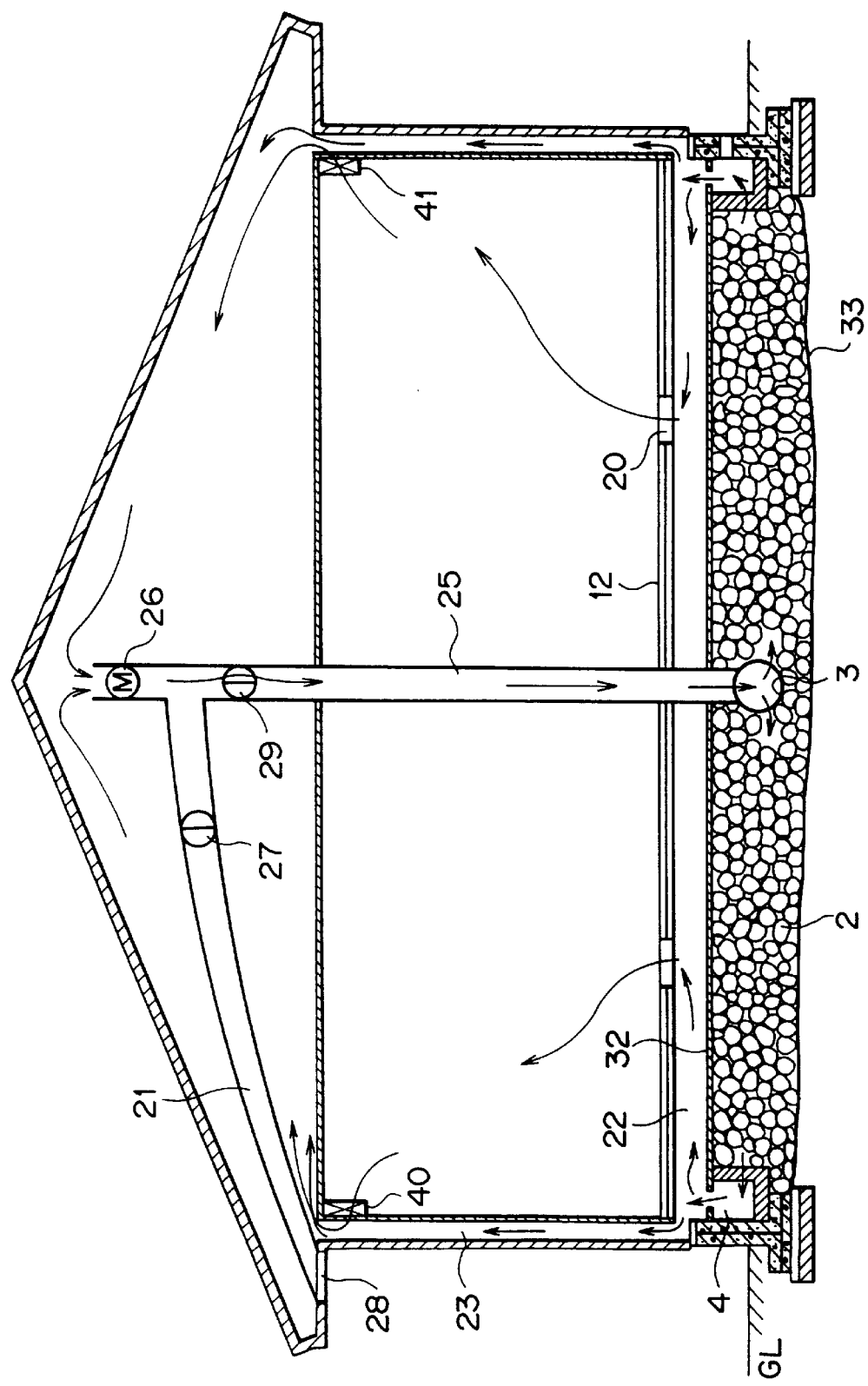
FIG. 6 is a view for illustrating an operation in the winter months where applying the first embodiment to a dwelling house.

Referring to FIG. 6, a reference numeral 25 is an inner wall air-flowing passage for applying said air in the attic to said cobble stone layer 2 while passing through a space formed between two inner walls between the rooms. In order to improve thermal conduction efficiency, the inner wall surface of this inner wall air-flowing passage 25 is formed into the bellows-like large in the surface area. Moreover, the lower end of this inner wall air-flowing passage 25 is connected with said perforated pipe 3 (refer to FIG. 1 and FIG. 2).

Moreover, a drive of said fan 8 (referring to FIG. 1 and FIG. 2) is set in advance by the control device in a manner to "revolve for three minutes every one hour" or the like in the winter months. The reason why said fan 8 is designed to revolve in a pace of "revolve for three minutes every one hour" herein is for the following.

In the winter months, said valve 27 is turned into the condition of "closed" by the temperature sensor and the control device (not shown) and said valve 29 is turned into the condition of "opened".

Moreover, temperature of the thermostat (not shown) is set at 15° C. in advance in the first embodiment. When the attic is warmed by solar heat and it becomes temperature of 15° C. or more, the motor for said fan 26 starts to revolve by said thermostat or said temperature sensor and said control device.

As a result, air in the attic warmed by solar heat further passes through said perforated pipe 3 from said inner wall air-flowing passage 25 and to move to the cobble stone layer 2 warmed by geothermal energy.

Namely, in the winter months, even though cold air from the outdoors is warmed by heat-exchanging with geothermal energy by said underground pipes 5 and 6, it is warmed frequently up to only temperature lower than that of warmed air in the inside of the room had heated, therefore, it is undesirable to set said fan 8 in advance so as to place air from the outdoors into the inside of the room at all time.

However, on the other hand, it is necessary to take new air from the outdoors into the building every a predetermined time period and to ventilate also in the winter months.

Accordingly, air from outdoors is designed to be supplied into the building after moving through the insides of said underground pipes 5 and 6, said perforated pipe 3, said cobble stone layer 2 and said hollow section 4 by driving said fan 8 in a pace of "by three minutes every one hour", as mentioned above. Said air from said outdoors (dried air in the winter months) not only is warmed by heat-exchanging with geothermal energy during the process of moving through the insides of said underground pipes 5 and 6 and said cobble stone layer 2 under the floor, but also humidity is controlled (humidified) and air is cleaned. Therefore, air supplied to the inside of the room for ventilation is warmed by geothermal energy and becomes air of which humidity is controlled and which is cleaned in this case.

Next, an emergency stopping device as shown in a block diagram of FIG. 7 is provided in the first embodiment. In FIG. 7, a reference numeral 92 is a smoke sensor for detecting smoke by fire provided on the inside and the outside of the building and, a reference numeral 93 is a gas sensor for detecting an occurrence of the toxic gas due to gas leak or the like in the inside and the outside of the building, a reference numeral 94 is a fan-motor for driving said fan 8 (referring to FIG. 1 and FIG. 2) and fan 26 (referring to FIG. 5 and FIG. 6), and a reference numeral 95 is a micro-computer for stopping said fan-motor 94 based on the detected signals from said smoke sensor 92 or gas sensor 93. In the first embodiment, when detecting smoke by fire, or the occurrence of the toxic gas due to gas leak, since revolution of said fan 8 and 26 is designed to be stopped by the micro-computer 95, it is designed to be prevented in advance effectively that "smoke and toxic gas are diffused over the entire building".

Figure 8A:
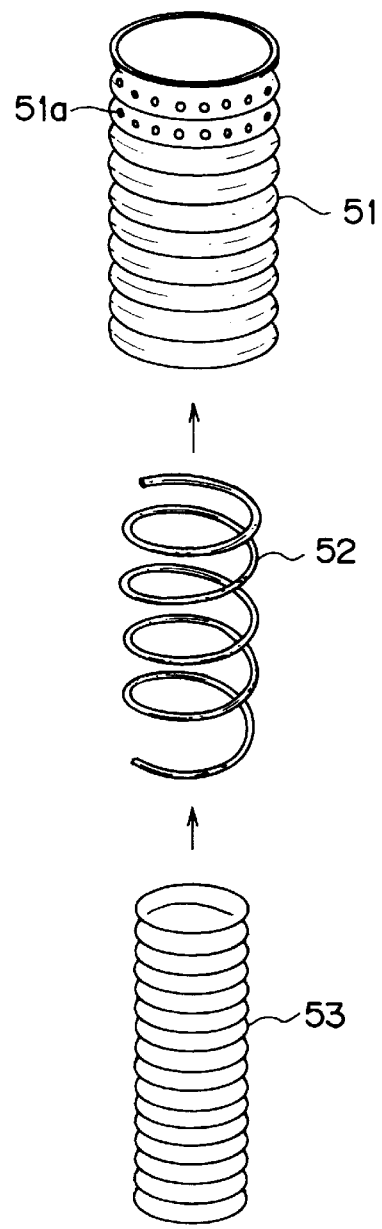
FIG. 8 is a view for illustrating a structure of the underground pipe used in a second embodiment according to the invention.
Figure 8B:
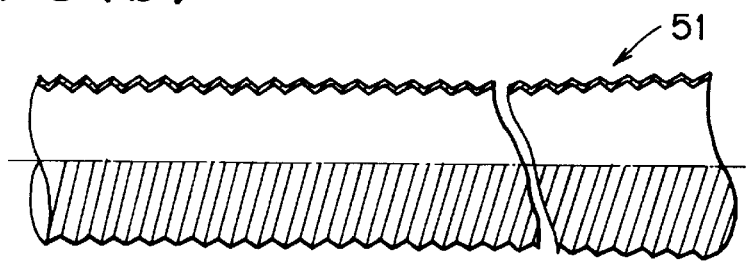

Next, FIG. 8 is a perspective view showing the underground pipe used in a second embodiment according to the present invention. Said underground pipe is formed by "double pipe" including an outer pipe 51 and an inner pipe 53 in this second embodiment. The outer pipe 51 and the inner pipe 53 are constituted by a spiral-shaped side wall (a side wall of a corrugated form in a cross section) made of metal such as aluminum or plastic such as polyethylene and polyester.

In FIG. 8(*a*), a reference numeral 51 is the outer pipe of diameter about 300 to about 450 mm made of aluminum or made of polyethylene or polyester. Since the outer pipe 51 is constituted by a thin and corrugated side wall (the spiral-shaped side wall of a corrugated form in a cross section as mentioned above) as show in FIG. 8(*b*), the surface area is extremely wide as compared with the conventional pipe. When forming the outer pipe 51 with plastic, the thickness of the outer pipe 51 can be thinned extremely as is the degree of approximately 2 to 4 mm, for example.

Therefore, even though, in general, it is said that thermal conductivity of the pipe made of plastic is low as compared with that of the pipe made of metal, since the outer pipe 51 is formed widely in the surface area and thinly in thickness as mentioned above, geothermal energy can be transmitted to the inside of the outer pipe 51 easily despite of using the wall made of plastic in the second embodiment.

Moreover, a plurality of openings (holes) 51*a* for allowing air from the outdoors to flow thereinto are formed on the upper of the spiral pipe for the outside 51 in FIG. 8(*a*).

Moreover, a reference numeral 52 is a spiral-shape belt made of metal such as aluminum or plastic in FIG. 8(*a*). This spiral-shape belt 52 is formed by forming an elongate belt-shaped (or ribbon-shaped) sheet made of aluminum into a spiral shape (a coil shape). This spiral-shape belt 52 is used in a manner to be arranged on the inside of the outer pipe 51 so as to contact with the inner wall surface of said outer pipe 51.

Therefore, geothermal energy from said outer pipe 51 is transmitted easily to the spiral-shape belt 52, thereby the spiral-shape belt 52 being maintained at the same temperature as the outer pipe 51.

Moreover, a reference numeral 53 is the inner pipe made of plastic or made of metal and is arranged on the inside of said spiral-shape belt 52 in FIG. 8(*a*). This inner pipe 53 also is formed into a corrugated form and widely in the surface area similarly to said outer pipe 51 and thinly in thickness.

As described above, the underground pipe is constituted by the outer pipe 51 better in thermal conduction efficiency because of wideness of the surface area and thinness in thickness, the spiral-shape belt 52 better in thermal conduction efficiency and the inner pipe 53 better in thermal conduction efficiency because of wideness of the surface area and thinness in thickness in the second embodiment.

The building air conditioning system which the underground pipes of the second embodiment has provided is similar to the first embodiment shown in FIG. 1 and FIG. 2. Namely, the second embodiment is obtained by replacing the underground pipes 5 and 6 of FIG. 1 and FIG. 2 with the underground pipe of FIG. 8 in the system shown of the first embodiment in FIG. 1 and FIG. 2.

Moreover, in the second embodiment, air from the outdoors contacts with the inner wall surface of the outer pipe 51 and the surface of said spiral-shape belt 52, thereby temperature of said air to be controlled (to be cooled in the summer months and warmed in the winter months).

Moreover, said air contacts with the inner wall surface (the surface-contact portion) of the outer pipe 51 formed on said corrugated form and the surface (the surface-contact portion) of the spiral-shape belt 52 at same time, thereby humidity in said air to be controlled. In the case of much-moisturized air, water vapor in said air is condensed into dew on the inner wall surface of said outer pipe 51 and the surface of said spiral-shape belt 52, thereby said air to be dehumidified. On the other hand, in the case of dry air, moisture deposited on the inner wall surface of said outer pipe 51 and the surface of said spiral-shape belt 52 is supplied to said air, thereby said air to be humidified.

Moreover, said air contacts with the inner wall surface (the surface-contact portion) of said outer pipe 51 and the surface (the surface-contact portion) of said spiral-shape belt 52 at same time, thereby to be cleaned. That is, the minute impurities in air are absorbed into moisture of the inner wall surface of said outer pipe 51 and the surface of said spiral-shape belt 52 at same time, thereby said air to be cleaned.

Moreover, an explanation of a situation of movement of air in the underground pipe and the constitution except for the underground pipe of FIG. 8 in this second embodiment is omitted since it is same or similar to the explanation in the first embodiment.

Although said underground pipes 5 and 6 are arranged to be buried into the ground of the outside of the building, for example, the ground such as the garden or a parking lot that there is in the outside of the building in each embodiment described above, said underground pipes 5 and 6 may be arranged to bury into the ground of the inside of the building to heat-exchange air from the outdoors with geothermal energy, to control humidity and to clean air by the underground pipes 5 and 6 buried into the ground of the inside of the building and to feed this air which has been heat-exchange, humidity-controlled and cleaned to said cobble stone layer 2.

Moreover, although the underground pipe is formed by interposing the spiral-shape belt 52 in the clearance between the outer pipe 51 and the inner pipe 52 in the second embodiment shown in FIG. 8, the underground pipe may be constituted by only the outer pipe 51 and the inner pipe 52 without using the spiral-shape belt 52 in the second embodiment.

As described above, since heat-exchange with geothermal energy is designed to perform in the underground pipes (5, 6, 51, 53) in the air conditioning system of the building using geothermal energy according to said each embodiment, heat-exchange with geothermal energy has come to be able to be performed extremely efficiently.

Moreover, in said each embodiment (in said first or second embodiment), since air heat-exchanged with geothermal energy by said underground pipes (5, 6, 51, 53) is designed to apply into the building after applying to the cobble stone layer 2 under the floor in which numerous cobble stones are filled, said air has come to be supplied to the inside of the building after humidity is controlled and air is cleaned in the inside of the cobble stone layer 2 under the floor.

Namely, in said each embodiment, when much-moisturized air moves in the cobble stone layer 2 under the floor, moisture contained in the air is condensed into dew on the surfaces of the numerous cobble stones, thereby dehumidification of air (humidity control) to be performed.

Moreover, in said each embodiment, when dry air moves in the cobble stone layer 2 under the floor, moisture deposited on the surfaces of said numerous cobble stones is supplied to said air, thereby humidification of air (humidity control) to be performed.

Furthermore, in said each embodiment, the minute impurities such as dust contained in air moving in said cobble stone layer 2 under the floor are allowed to deposit onto moisture existing on the surface of said numerous cobble stones, whereby said air has come to be cleaned.

Moreover, in said each embodiment, said air heat-exchanged with geothermal energy in said underground pipes (5, 6, 51, 53) is designed to supply to the cobble stone layer 2 formed throughout the space under the floor to supply and store geothermal energy to the whole of the cobble stone layer 2, whereby the whole of the floor 12 (FIG. 5) of the building has come to be warmed by transmission of geothermal energy from said cobble stone layer 2 under the floor in the winter months, and the whole of the floor 12 (FIG. 5) of the building has come to be cooled by transmission of geothermal energy from said cobble stone layer 2 under the floor in the summer months.

Moreover, in said each embodiment, when said underground pipes (5, 6, 51, 53) are arranged to be buried in the ground of the outside of the building, it has come to be easy to attach the underground pipes (5, 6, 51, 53) in the already existing building, whereby an after-attachment (an external attachment) work of the building air conditioning system using geothermal energy according to the invention on the already existing building has come to be able to perform extremely easy and at a lower cost.

Moreover, in said each embodiment, the underground pipes (5, 6, 51, 53) are arranged in the ground of the outside of the building, whereby maintenance such as repair or replacement of the underground pipes (5, 6, 51, 53) has come to be able to perform extremely easy and at a lower cost.

Moreover, in said each embodiment, heat-exchange with geothermal energy is designed to perform in the underground pipes (5, 6, 51, 53), and said air air which has been temperature-controlled, humidity-controlled and cleaned is designed to supply to the inside of the cobble stone layer 2 through the perforated pipe 3 (refer to FIG. 1), whereby said air from the underground pipes (5, 6, 51, 53) has come to be able to supply to the whole of the cobble stone layer 2 under the floor approximately uniformly and efficiently.

Moreover, in said each embodiment, the "surface-contact portions" are designed to be provided on the outer pipes (5a, 51) constituting the underground pipe 2, or in the clearance between the outer pipe 51 and the inner pipe 52. Moreover, the "surface-contact portion" refers to a member having the surface with which air moving in the clearance between said outer pipe 51 and inner pipe 53 contacts as is a number of fins 5e of FIG. 3, the spiral-shape belt 52 of FIG. 8 or the inner wall surface of the outer pipe 51 which a cross section of FIG. 8 is formed into the corrugated form or the like, herein.

By providing said "the surface-contact portions", said air moving in the clearance contacts with said surface-contact portion efficiently, whereby heat-exchange with geothermal energy of said air can be not only performed extremely efficiently, but humidity control of said air and cleaning also has come to be able to perform.

Namely, in the invention, when much-moisturized air moves in the inside of said underground pipes (5, 6, 51 and 53), moisture (water vapor) included in the air is condensed into dew on the surface of said surface-contact portions, whereby dehumidification (humidity control) of air is performed. Moreover, when dry air moves in the inside of said underground pipes (5, 6, 51 and 53), moisture deposited on the surfaces of said surface-contact portions are supplied to said air, whereby humidification (humidity control) of air has come to be perform.

Furthermore, the minute impurities such as dust contained in air moves in the inside of said underground pipes (5, 6, 51 and 53) are allowed to deposit onto moisture existing on the surface of said "the surface-contact portions", whereby said air has come to be cleaned. That is, the surface-contact portions clean said air by attaching (adhering) said minute impurities such as dust contained in said air onto moisture of said surface of "the surface-contact portions" when said air moves in said underground pipes (5, 6, 51 and 53).

Namely, in said each embodiment, a location of a part of said cobble stone layer 2 is designed to provide with the hollow section 4 providing the passage for feeding air from said cobble stone layer 2 into the building, and a substance for adding a pleasant odor to air from said cobble stone layer 2, as well as for controlling humidity and cleaning of said air is designed to provide in this hollow section 4, thereby to be able to add the pleasant odor to said air and to supply said air of which smell is masked and which is cleaned into the building.

What is claimed is:

1. A building air conditioning system using geothermal energy, comprising:

an underground pipe having a length within the range of from approximately 1 m to approximately 10 m, said underground pipe buried underground for introducing air from the outdoors into the inside thereof so as to transmit geothermal energy from the underground to said introduced air, a cobble stone layer constituted by filling numerous cobble stones in a space under the floor of a building, said cobble stone layer having a height within the range of from approximately 250 mm to approximately 1,000 mm, said cobble stone layer storing geothermal energy in said numerous cobble stones and air layers existing in minute clearances between said numerous cobble stones, said cobble stone layer introducing said air to be transmitted geothermal energy in said underground pipe into the inside thereof, said cobble stone layer heat-exchanging said introduced air with geothermal energy stored in said numerous cobble stones and said air layers, controlling humidity of said air by attaching water vapor contained in said air onto the surface of said numerous cobble stones when much-moisturized air moves in said cobble stone layer and by supplying moisture deposited on the surface of said numerous cobble stones to said air when dry air moves in said cobble stone layer, and cleaning said air by attaching minute impurities such as dust contained in said air onto moisture deposited on the surface of said numerous cobble stones when said air moves in said cobble stone layer, and air supply means for supply said air from said cobble stone layer to an inside of a room of the building.

2. The building air conditioning system using geothermal energy according to claim 1, wherein said underground pipe is buried in an ground of an outside of the building.

3. The building air conditioning system using geothermal energy according to claim 1, wherein said underground pipe is buried in an ground of an inside of the building.

4. The building air conditioning system using geothermal energy according to claim 1, wherein said cobble stone layer has a perforated pipe which a number of holes are formed, said perforated pipe introducing said air from said underground pipes in the inside thereof to feed this introduced air to said cobble stone layer through said number of holes.

5. The building air conditioning system using geothermal energy according to claim 1, wherein said underground pipe comprising:

an outer pipe in which upper surface and bottom surface are closed, said outer pipe transmitting geothermal energy from the outdoors to air from the outdoors when said air from the outdoors flowed from a hole formed on the upper portion thereof move along the inner wall thereof downwardly; and an inner pipe which is provided in the inside of said outer pipe, said inner pipe taking said air moved up to the bottom of said outer pipe along the inner wall surface of said outer pipe into the inside thereof so as to move said air upward and to feed said air into said cobble stone layer.

6. The building air conditioning system using geothermal energy according to claim 5, wherein said outer pipe is formed into a corrugated form in a cross section.

7. The building air conditioning system using geothermal energy according to claim 1 further comprising an emergency stopping device for stopping said air supply means when harmful gas is generated due to a fire or gas leak, said emergency stopping device has detecting means for detecting generation of the harmful gas due to a fire or gas leak and control means for stopping said air supply means based on a signal from said detecting means.

8. The building air conditioning system using geothermal energy according to claim 1, wherein said underground pipe has a surface-contact portion formed to having a surface extending in a perpendicular direction or in a slanting direction to the direction of the movement of air such that moving air in said underground pipe contacts with said surface efficiently, said surface-contact portion transmitting geothermal energy from the underground to said air, controlling humidity of said air by attaching water vapor contained in said air onto the surface thereof when much-moisturized air moves in said underground pipe and by supplying moisture deposited on the surface thereof to said air when dry air moves in said underground pipe, and cleaning said air by attaching minute impurities such as dust contained in said air onto moisture deposited on the surface thereof when said air moves in said underground pipe.

* * * * *